INVENTOR
TOSHIYUKI FUKUNAGA
BY: McGlew and Toren
ATTORNEYS

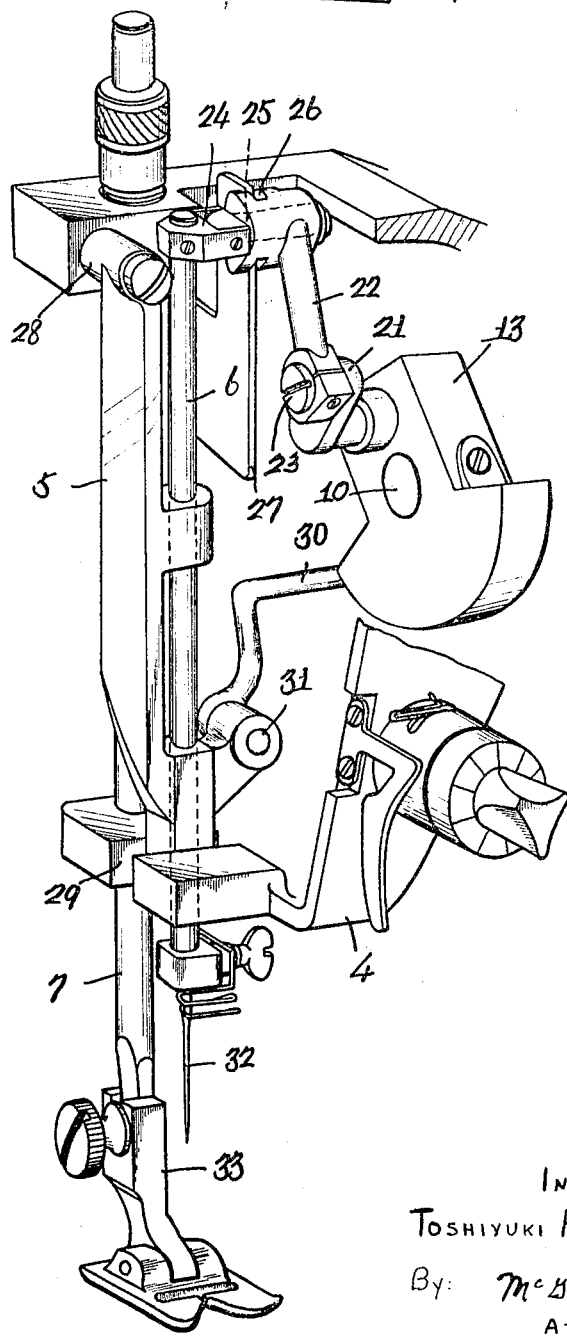

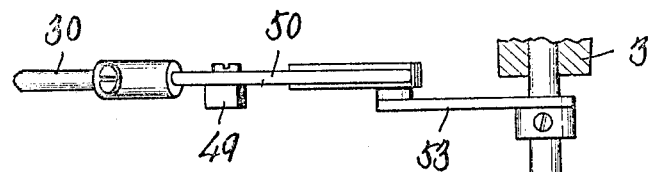
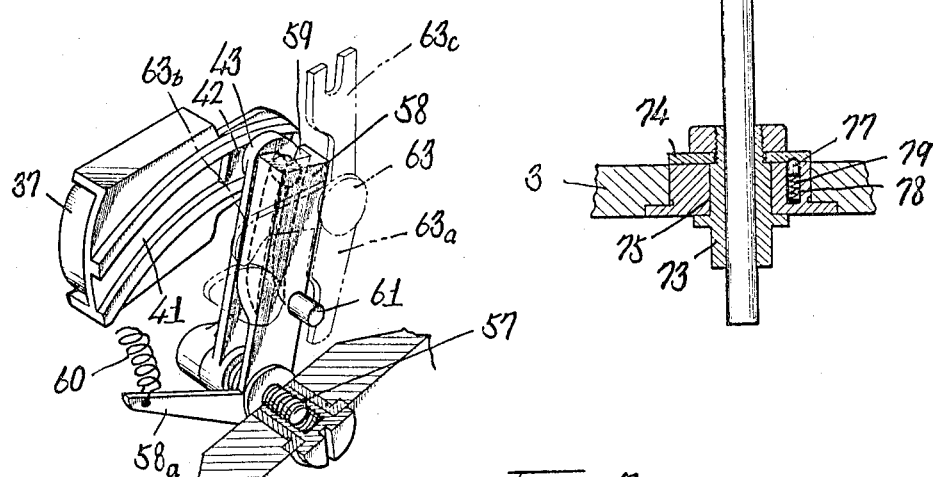
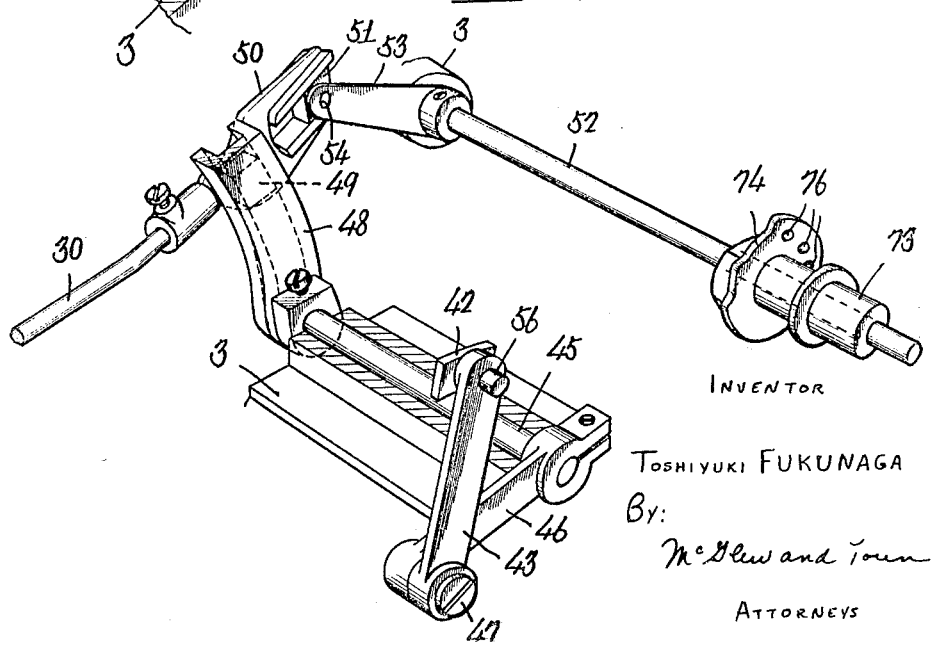

INVENTOR
TOSHIYUKI FUKUNAGA
By:
McGlew and Toren
ATTORNEYS

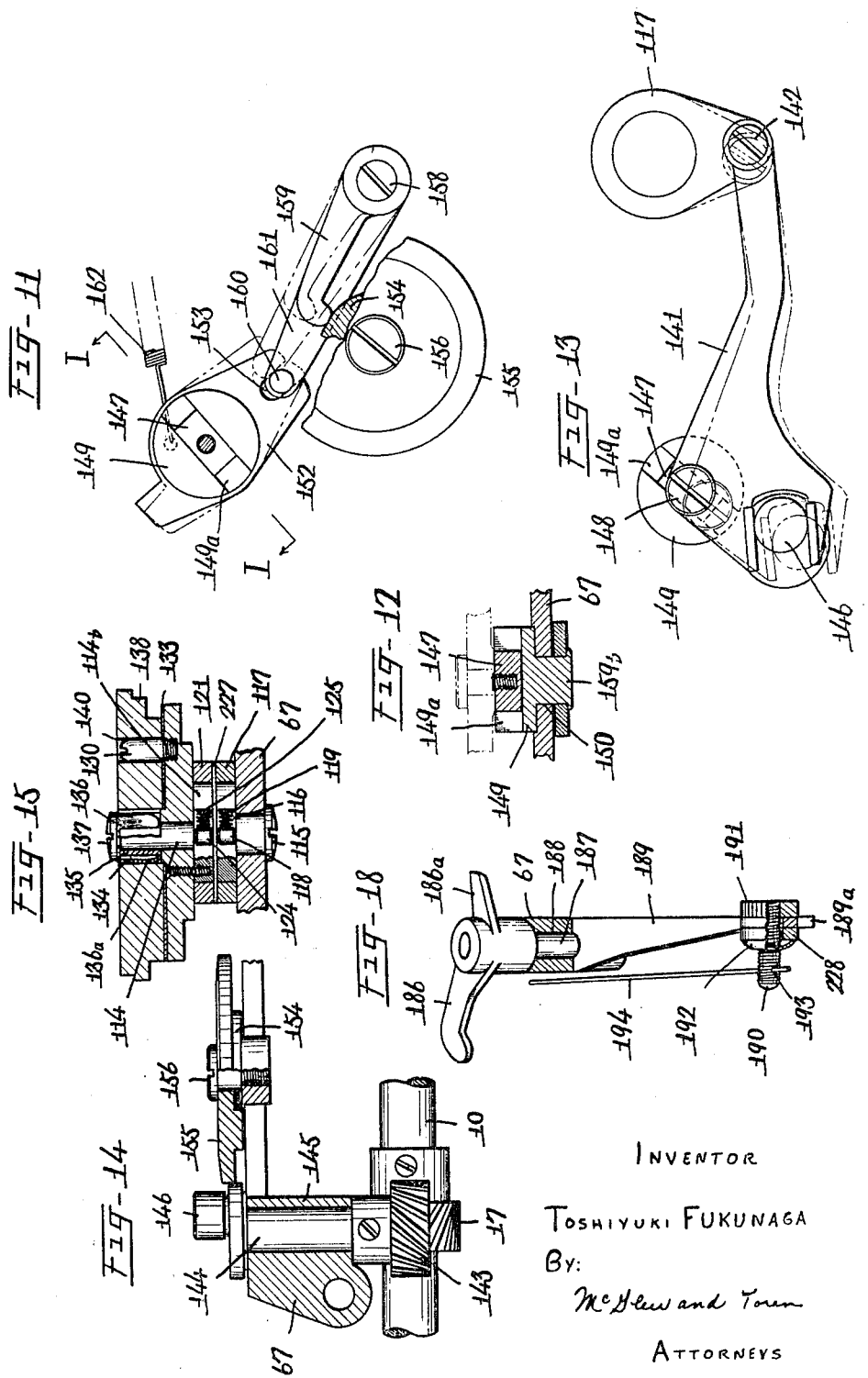

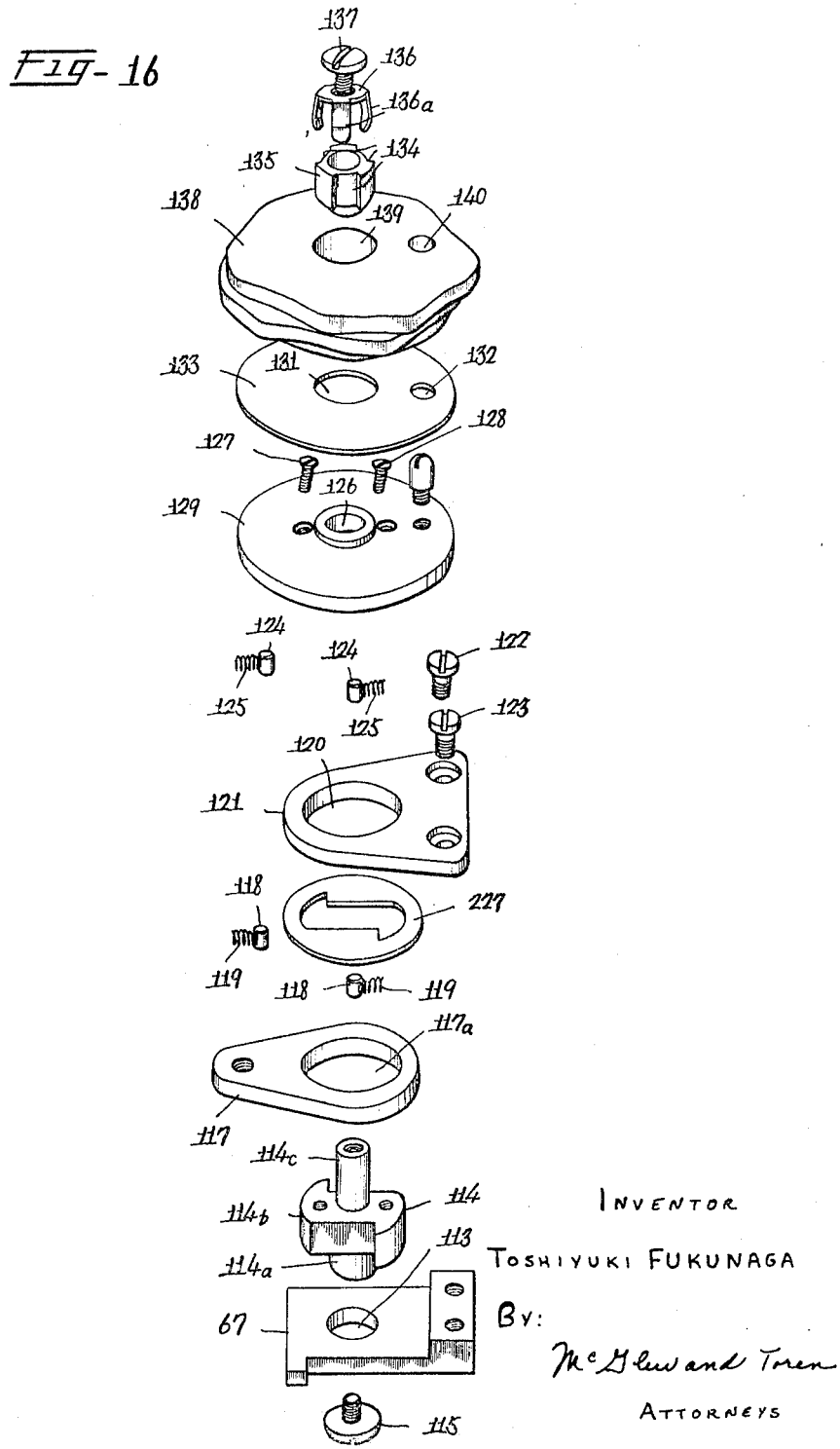

Fig-17

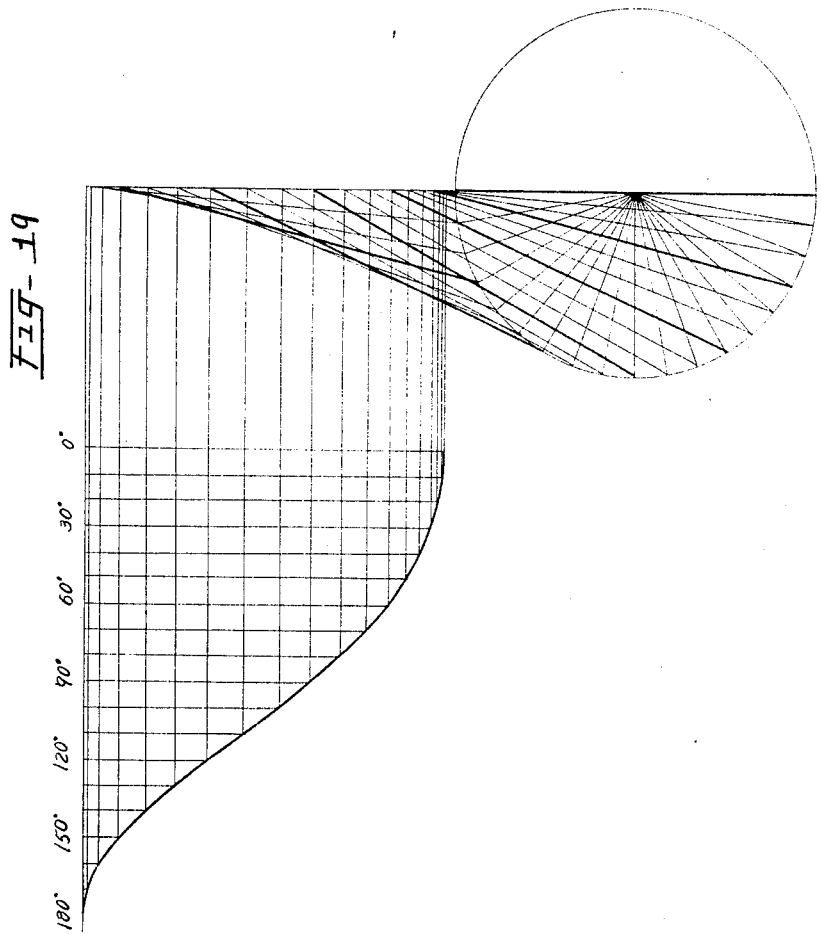

INVENTOR
TOSHIYUKI FUKUNAGA
By: McGlew and Toren
ATTORNEYS

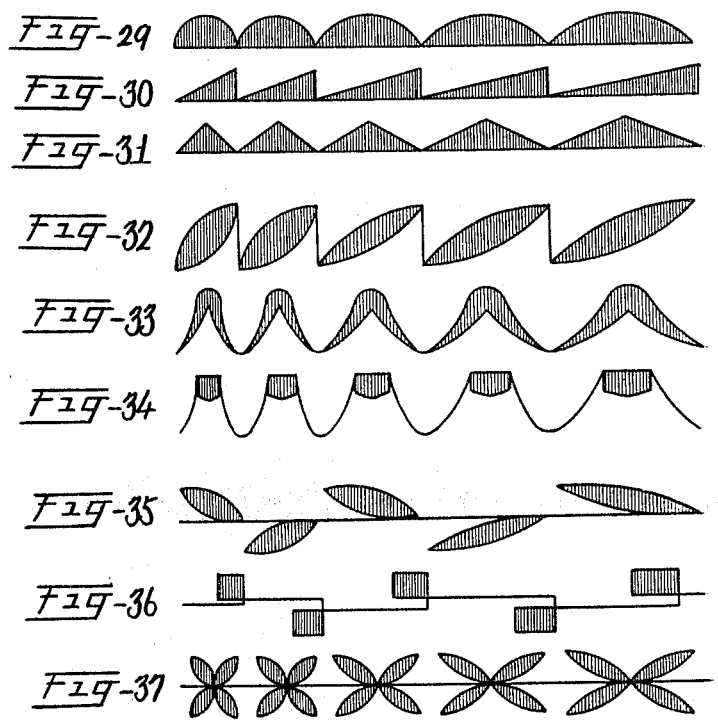

United States Patent Office 3,291,082
Patented Dec. 13, 1966

3,291,082
ZIGZAG SEWING MACHINE
Toshiyuki Fukunaga, Tokyo, Japan, assignor to Sanshin Zigzag Sewing Machine Company, Limited, Tokyo, Japan
Filed Sept. 11, 1963, Ser. No. 308,104
Claims priority, application Japan, Apr. 16, 1963, 38/19,489
8 Claims. (Cl. 112—158)

This invention relates to a zigzag sewing machine capable of obtaining sewed patterns which heretofore have never been obtained successfully.

Zigzag sewing machines generally consist of a mechanism which brings a needle bar supporter into reciprocating motion to produce zigzag stitch, a mechanism determining needle position so that the basic needle line, that is, the seam line of the needle may be positioned to the right or left side of the center line, and a mechanism which feeds cloth at a speed correlative to the reciprocating motion of needle. Embroidery is effected by separate control of these three mechanisms. However, as for the means for controlling this pattern stitch, it is well known that there are two control methods, one is hand control of these three mechanisms, and the other is automatic control of some of them by a pattern cam.

In conventional zigzag machine heretofore used for ordinary domestic sewing, the oscillatory amplitude of the needle, which makes reciprocating motion jointly with the needle bar supporter, is approximately 5 mm. Actually in case the needle's transverse amplitude exceeds 5 mm., the hook end of the shuttle and the needle, which rotate correlatively at a definite position, do not match in timing, and accordingly lower thread placed within the shuttle or bobbin is apt to be disconnected with upper thread tied to the needle. Therefore, 5 mm. is probably the maximum of the needle's transverse amplitude. In view of the circumstances, the main effort has been to obtain as many and as diverse patterns as possible within such limit. However, it is very difficult to obtain desirably large pattern stitches in a repetitive sequence by conventional zigzag sewing machines, and it is impossible to adjust the size of the pattern to obtain the same stitch pattern but in a larger range of sizes. As mentioned above, the maximum transverse amplitude of oscillation of 5 mm. is too small even if the pattern size, with respect to one pattern, may be adjustable, it is not possible practically, and is very difficult, to embroider stitches forming letters of the alphabet, for example.

Today's market needs, instead of conventional machine whose capability in pattern stitch work is within aforesaid limit, a zigzag sewing machine that can freely work out any size of pattern.

A major object of this invention is to provide a zigzag sewing machine which sufficiently meets the demands of the market, namely a machine which can easily and freely enlarge or reduce, in a wide range of sizes, similar patterns formed by hand control by an automatic control pattern cam (including letters), and freely and easily change them and thus obtain easily a variety of patterns.

Another object of this invention is to provide a zigzag sewing machine which can perform easily and rapidly, free from any trouble, with easy installation, removal or replacement of pattern cam.

A further object of the invention is to provide a zigzag sewing machine in which the vertical motion of the needle, in the upper portion of its stroke, is relatively fast, while the vertical motion of the needle, in the lower portion of its stroke, is much slower.

Yet another object of the invention is to provide a zigzag sewing machine having a coordinated control, either manual or automatic, of the amplitude of oscillation of the needle, the stitch length, and the rate of feed of the work.

A still further object of the invention is to provide a zigzag sewing machine in which pattern cams may be easily and quickly removed, interchanged, and installed.

Still another object of the invention is to provide a zigzag sewing machine in which the size of patterns may be very greatly changed, both in an increasing and a decreasing direction, without changing the form of the pattern or, in other words, similar stitches may have a wide variety of sizes.

In accordance with the invention, a zigzag sewing machine is provided having a shuttle and bobbin mounted on a transverse axis. The upper end of a needle bar crank rod is fixed to the upper end of the needle bar and its lower end to a needle bar crank fixably positioned, but adjustable, in a balance cam. When the needle bar is in the upper portion of its stroke, the vertical movement is accelerated and, when the needle bar is in the lower portion of its stroke, the vertical movement is decelerated.

FIG. 4 is a perspective view illustrating the mechanism operating the needle bar;

FIG. 6 is a partial perspective view, partially in section, illustrating a portion of the mechanism for adjusting the amplitude of a zigzag stitch;

FIG. 7 is a partial perspective view, partially in section, of mechanism for adjusting the size of embroidered figures and which is connected to the mechanism for adjusting the stitch width;

FIG. 8 is a plan view, partially in section, corresponding to FIG. 7;

FIG. 11 is a partial plan view, partially in section, of the mechanism shown in FIG. 10;

FIG. 12 is a sectional view taken on the line I—I of FIG. 11;

FIG. 13 is a plan view of a part of the mechanism for rotating the pattern cam;

FIGS. 14 and 15 are partial vertical sectional view illustrating operating mechanism for the pattern cam;

FIG. 16 is an exploded perspective view of the pattern cam operating mechanism;

FIG. 17 is a transverse sectional view illustrating the adjusting mechanism for the cloth feed;

FIG. 18 is a partial perspective view, partially in section, illustrating other adjusting mechanism;

FIG. 19 is a graph illustrating the relation between the needle stroke and the rotation of the main shaft of the machine; and FIGS. 20 through 39 are illustrations of various stitch patterns which can be formed with the sewing machine of the invention.

Figure 1:
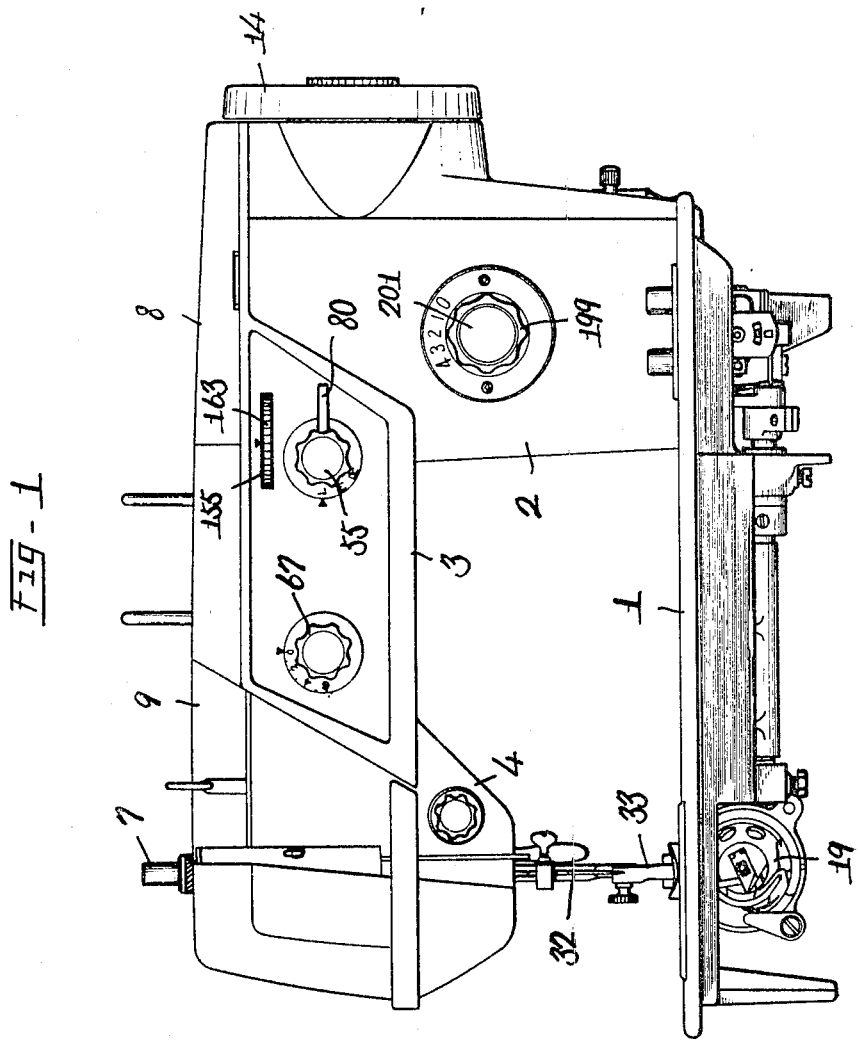
FIG. 1 is a side elevation view of a sewing machine embodying the invention.

As illustrated in FIG. 1 the sewing machine is essentially composed of a base 1, a hollow post 2 standing on the base, a hollow arm extending from said hollow post 2 and hollow head 4 on arm 3 thereof. A vertically reciprocating needle bar 6 is mounted in head 4 and is guided by a support 5. Head 4 also contains the cloth presser means 7. Arm 3 has an opening in its upper surface which is closed by a lid or cover 8 hingedly mounted on the upper end of post 2, and the remainder of arm 3 is enclosed by a cover 9 which is fixed in position relative to the arm.

Figure 2:
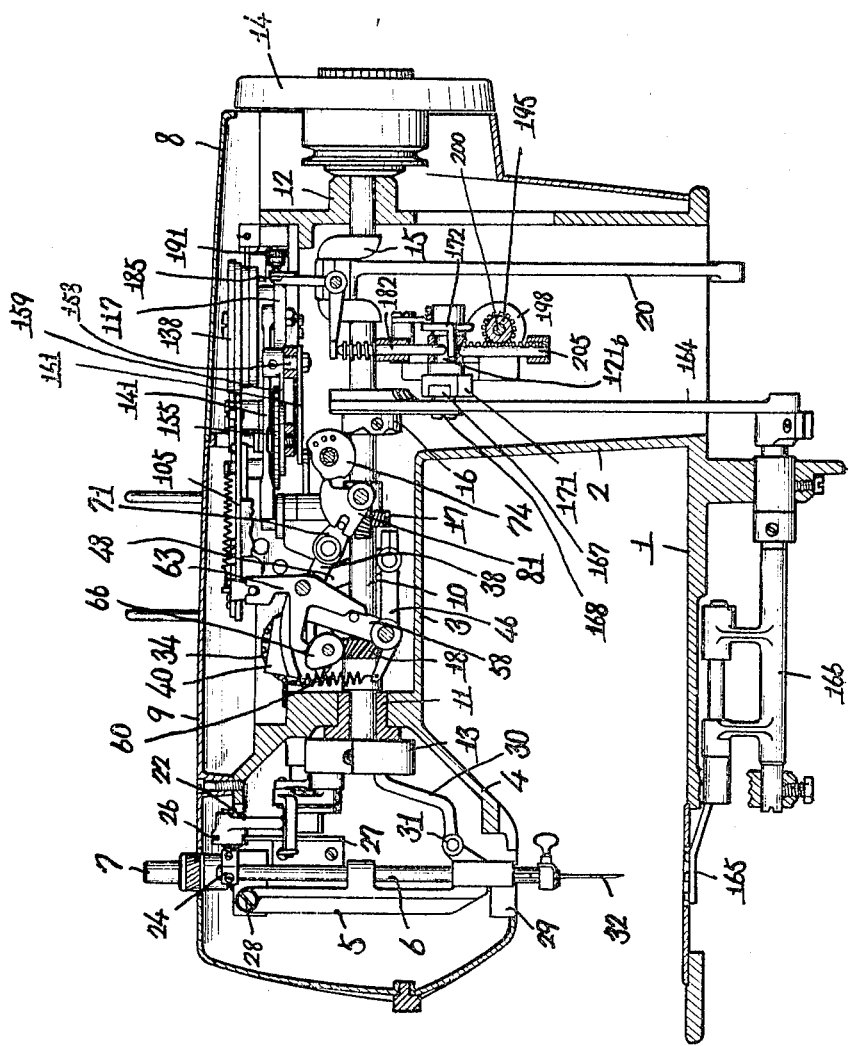
FIG. 2 is a longitudinal sectional view of the sewing machine.

As best seen in FIG. 2, a main drive shaft 10 extends longitudinally of arm 3 and is supported by bearings 11 and 12. One end of shaft 10 extends into head 4, and a balance weight 13 is secured to this end of shaft 10. The other end of shaft 10 has secured thereto a fly wheel 14 which may be rotated by an electric motor or by a foot pedal. Shaft 10 is formed with a crank portion 15 adjacent which is a triangular cam 16 controlling the feeding of the work. Shaft 10 is also provided with axially spaced spiral gears 17 and 18.

A shuttle drive shaft, which has not been illustrated, is mounted in the lower portion of base 1 and is connected to the shuttle and bobbin 19 which feeds the lower thread. The shuttle driving shaft is operated by a crank rod 20 connected to the crank portion 15 of shaft 10. The shuttle 19 is a transverse axis-type oscillatable shuttle which is oscillated in synchronism with the reciprocation of the needle.

Referring to FIGS. 2 and 4, a needle crank 21 is fixedly or non-rotatably, adjustably mounted eccentrically in balance weight 13. A crank rod 22 is pivotally connected to the outer end of crank 21 and the outer end of rod 22 is formed as a bushing which fits a pin 25. Pin 25 is connected by a universal joint 24 to the upper end of needle bar 6. The bushing at the outer end of rod 22 is formed with a slot 26 which is cooperable with a guide rail 27 in head 4.

Referring again to FIG. 4, and also to the graph of FIG. 19, during the upper portion of its stroke, the needle bar 6 has a relatively fast motion while, during the lower portion of its stroke, the needle bar 6 has a relatively slow motion. This is due to the provision of the vertical guide rail 27 which is fixedly mounted offset from the axis of the drive shaft 10. In the upper position of the parts shown in FIG. 4, the crank 21 occupies the position shown. The relation of the angular displacement of shaft 10 with respect to the vertical displacement of rod 6 is illustrated in FIG. 19. In this figure, the vertical motion of needle bar 6 is indicated by the vertical lines, and the angular displacement of shaft 10 is indicated by a circle. The distance of vertical motion of rod 6 is selected by proper positioning of the crank 21.

The adjustable fixed positioning of crank 21 on balance weight 13 provides an adjustment of the eccentricity of the lower pivot end of rod 22 with respect to the axis of shaft 10. In turn, this adjusts the relative speeds of the needle in the upper range of its movement and in the lower range of its movement. Such adjustment has the advantage that the time during which the needle is in the lower range of its movement, wherein it is operative in forming a stitch, may be adjusted in accordance with the feed of material and the amplitude of oscillation requisite to forming different patterns.

The needle bar support 5 is secured to the upper portion of hollow head 4 as indicated at 28, and support 5 is slidably engaged through a slot or groove 29 in the machine frame. An oscillatory rod 30 is pivotally connected to support 5 as indicated at 31. Thereby, support 5 may be oscillated with respect to groove 29 about its pivotal connection 28. Needle 32 is secured to needle bar 6 in the usual manner, and a cloth presser foot 33 is secured to the end of pressor rod 7.

If the amplitude of oscillation of needle bar 6 is increased, the position of the thread taking beak of shuttle 19 oscillated in synchronism with the reciprocation of needle 32 is still properly timed. The upper thread interlocks exactly with the lower thread within the permissible adjustment range, and the maximum amplitude of oscillation with the machine of the invention is approximately 15 mm., as compared to the maximum of 5 mm. of known zigzag sewing machines.

Figure 3:
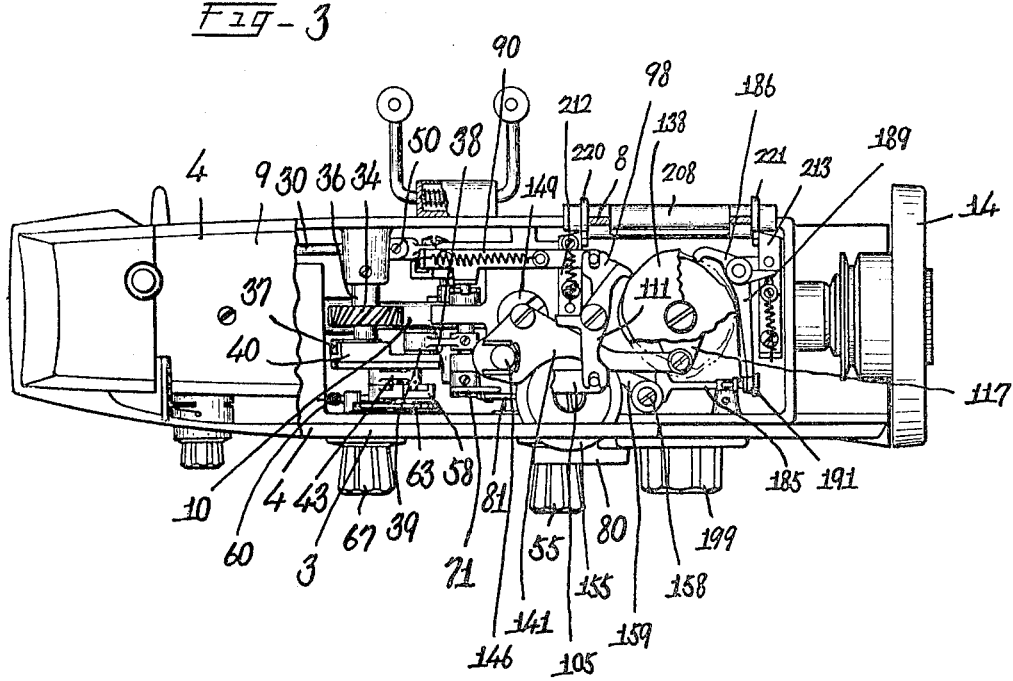
FIG. 3 is a top plan view of the sewing machine, with the cover partly removed.
Figure 5:
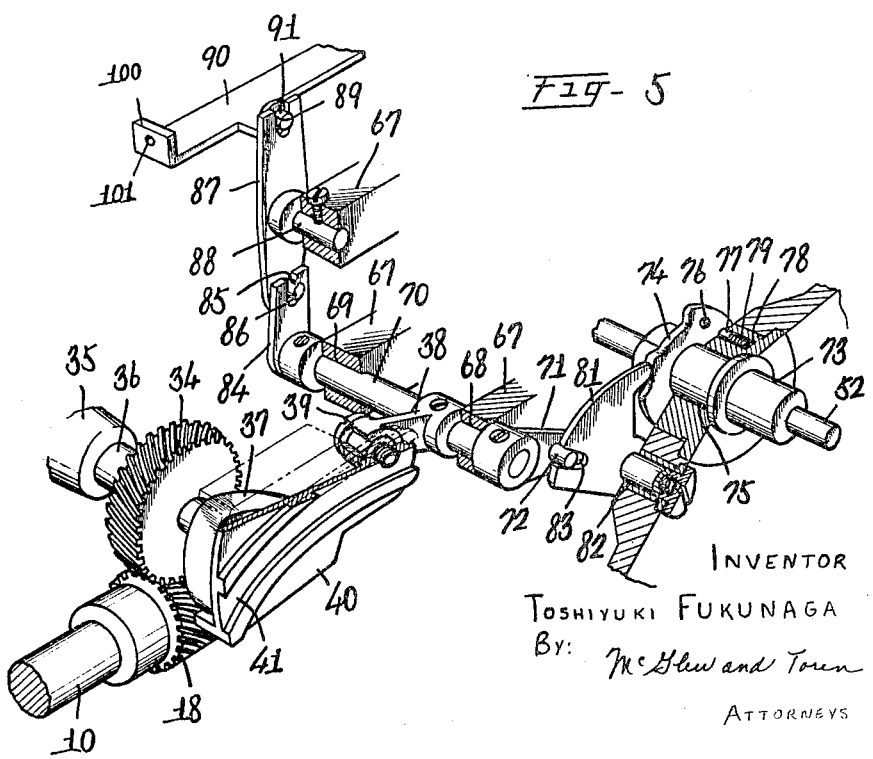
FIG. 5 is a partial perspective view, partially in section, illustrating the mechanism for adjusting the position of the stitching line and the mechanism for adjusting the size of a zigzag stitch.

Referring to FIGS. 2, 3 and 5, a spiral gear 34 meshes with spiral gear 18, and is rotatably mounted by means of a shaft 36 which is rotatably mounted in a bearing 35 in the inner side of the back wall of arm 3. A triangular cam 37 is rotatable with gear 34 and is embraced by a cam follower 40 which is pivotally connected at 39 to an arm 38 forming part of means for adjusting the needle position. The front face of the oscillatory cam follower 40 is formed with a guide groove 41, which, as best seen in FIG. 6 receives a guide 42 pivotally mounted on the outer end of an oscillatable arm 43. As best seen in FIG. 7, arm 43 is pivoted at 47, to the end of an arm 46 which is secured to a shaft 45 oscillatably mounted in the arm 3.

An arcuate arm 48 is also secured to shaft 45 and has a channel cross section receiving a slide 49 on a fork 50 secured to an end of the previously mentioned rod 30 connected to needle bar 6. When shaft 10 is rotated, triangular cam 37 is rotated through spiral gears 18 and 34. This oscillates arm 40 and the oscillatory movement of arm 40 is transmitted to the arm 48 thereby support 5 for needle bar 6 is oscillated through the rod 30.

As illustrated in FIGS. 7 and 8, a slide 51 is fitted in the forked portion of forked head 50. The slide is carried by an arm 53 which is fixed to shaft 52 which has an end extending forwardly from arm 3 and having a knob 55 secured on its exposed outer end. When shaft 52 is angularly adjusted by means of knob 55, the arm 53 is angularly adjusted which displaces fork 50 inwardly or outwardly along the curved arm 48. The distance of slide 49 on arm 50 from the axis of shaft 45, as thus adjusted, determines the stroke of the rod 30 and thus the amplitude of oscillation of the needle bar support 5. In the position of the parts illustrated in FIG. 7, the needle is oscillated uniformly relative to its center line of travel.

Referring to FIG. 6, a pin 56 on arm 43 is engaged in a channel-shaped guide arm 61 which is mounted in front of the arm 43 and is pivotal about a pin 57 in arm 3. The channel arm 58 has a guide groove 59 receiving the pin 56, and a tension spring 60 is connected between pin 56 and a fixed member 58a on arm 3. By this means, slide 42 is continuously biased toward the pivot 39 of follower arm 40. When slide 42 is adjacent pivot 39, arm 43 is not oscillated even if arm 40 is oscillated and thus the needle bar support 5 is not oscillated.

A pin 61 extends forwardly from arm 58 and is engaged in a slot in one arm of a three-armed member 63 which is pivoted, at 62, in the front wall of arm 3. A shaft 64 is rotatably mounted in the front wall of arm 3 in spaced relation to pivot 62, as indicated at 65. A cam 66 is secured to the inner end of shaft 64 and is engaged with an arm 63b of the part 63, and a small knob 67 (FIG. 1) is secured to the outwardly projecting end of shaft 64. When knob 67 is turned to angularly adjust shaft 64, part 63 is angularly adjusted through the medium of the cam 66 through pin 61, arm 58 is angularly adjusted to determine the position of slide 42 with respect to the pivot of cam follower 40. This determines the amplitude of oscillation of needle bar support 5. If there is no change in the position of fork 50, the amplitude of oscillation of the needle is thus adjusted. It will be noted that, from FIG. 7, when slide 49 is at the axis of shaft 45, there is no oscillation of the needle bar support.

Referring to FIG. 5, the arm 38 is part of the needle positioning determining mechanism and is fastened to a shaft 70 mounted in a bearing 68 in a support member 67 fixed in arm 3. An arm 71 is secured to an end of shaft 70 and carries a pin 72 which is engaged in slot 83 in a plate-like cam follower 81. A hub member 73 is angularly adjustable on the shaft 52 and extends forwardly to the front wall of machine arm 3. A three position cam 74 is secured to the inner portion of hub 73 which latter has a bearing member 75 positioned in an aperture in the front wall of machine arm 3. Three detent recesses 76 are formed in the face of cam 74 for engagement with a detent pin 77 mounted in a bore in bearing 75 and biased outwardly by a spring 79. The cam 74 can be adjusted stepwise by virtue of the detent means 76 and 77.

Referring to FIG. 1, a lever 80 is secured to the outwardly extending portion of hub 73. When hub 73 is angularly adjusted by means of lever 80, cam 74 is adjusted. The cam follower plate 81 is engaged with cam 74 and is therefore angularly adjusted in accordance with the position of cam 74. Cam follower 81 is rotatably mounted in a bearing 82 in the front wall of arm 3. Adjustment of cam follower 81, through the medium of pin 72 engaged in slot 83, adjusts the arm 71 and thereby through the shaft 70, the arm 38. In turn, this adjusts the pivot point of the follower 40, so that the needle position may be manually set.

As shown in FIGS. 3, 5 and 7, an arm 84 is secured to the innermost end of shaft 70 and has a slot 86 in its outer end in which there is engaged a pin 85 on one end of a two-arm rocking lever 87. The other end of lever 87 has a slot 89 in which is engaged a pin 91. Lever 87 is pivoted, as at 88, in a support 67 within machine arm 3.

Figure 10:
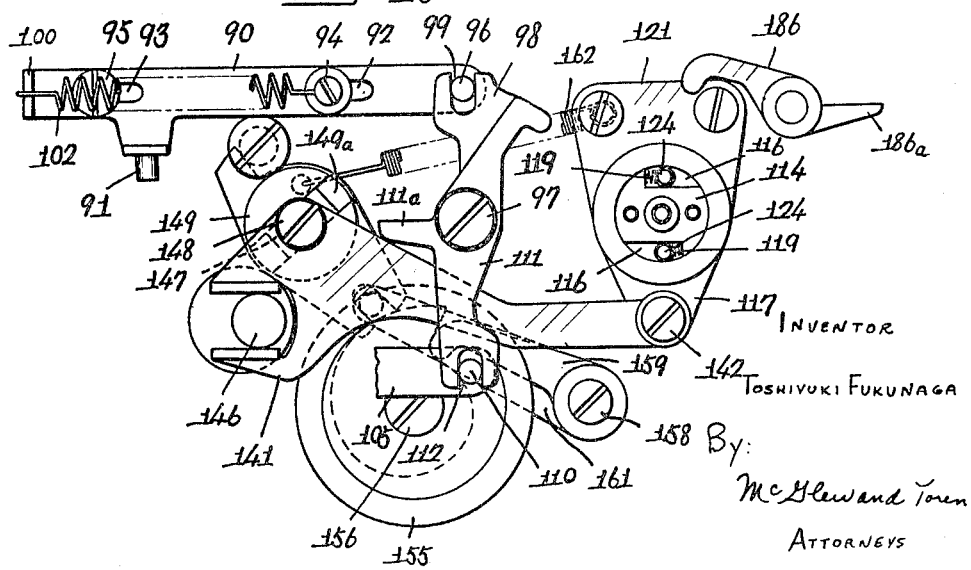
FIG. 10 is a plan view, partly in section, illustrating the mechanism for rotating the pattern cam.

The slide 90 is longitudinally adjustable along the support member 67 and, as best seen in FIG. 10, is formed with slots 92 and 93 through which extend bolts or screws 94 and 95, respectively. A pin 96 extends upwardly from the righthand end of slide 90, as viewed in FIG. 10, and is engaged in a slot 99 in a rocking lever 98 pivotally mounted at 97 on support portion 67. As described hereinafter, lever 98 is oscillated in accordance with the contours of a pattern cam.

In order to maintain arm 98 in following engagement with the pattern cam, the lefthand end of slide 90 is formed with an upstanding portion 100 having an aperture 101 therein. One end of a spring 102 is hooked into this aperture and the other end of the spring is secured to screw 94. When arm 98 is moved by the pattern cam, slide 90 is correspondingly moved to swing the lever 87 and thus angularly displace the arm 84 and the shaft 70. This effects automatic adjustment of the line of action of the needle.

Figure 9:
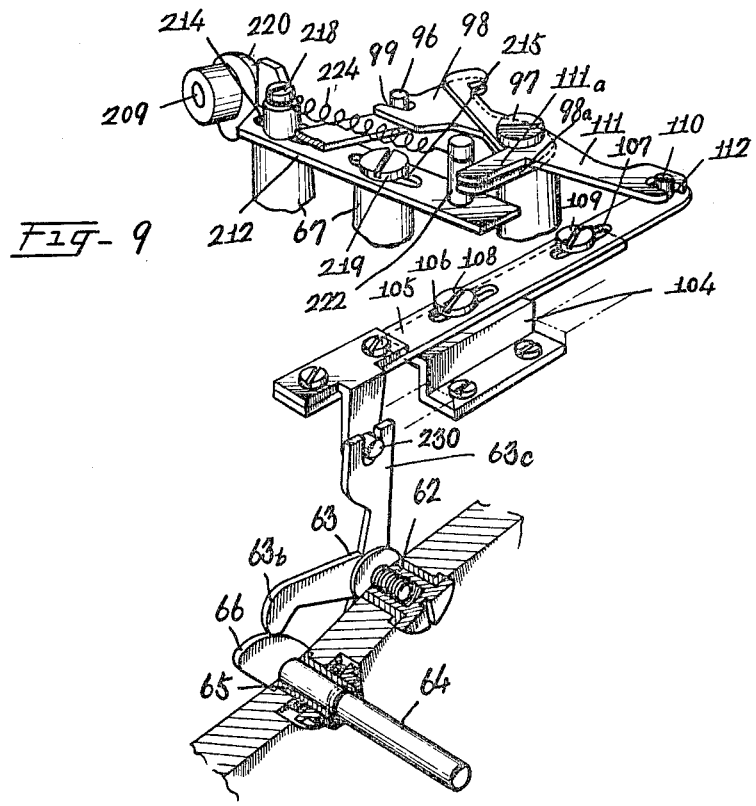
FIG. 9 is a partial perspective view, partially in section, illustrating mechanism for adjusting the size of a zigzag stitch.

Referring to FIGS. 2, 3 and 9, a notch 103 is formed in the third arm 63c of member 63 and has engaged therein a pin 230 on a slide 105 which is longitudinally slidably mounted on a support member 104 in machine arm 3. Slide 105 has elongated apertures 106 and 107 through which extend screws or bolts 108 and 109, respectively, secured to the support 104. The other end of slide 105 carries a pin 110 engaged in a notch 112 in a rocking lever 111 pivoted at 97 on support portion 67 along with the lever 98. Lever 111 is continuously spring biased into contact with the pattern cam and, when it is angularly displaced by the pattern cam, it longitudinally displaces slide 105 to angularly displace the member 63 which, through engagement with pin 61, adjusts the angular position of arm 43 relative to the pivot point of cam follower 40. Thereby, the amplitude of oscillation of the needle is automatically controlled by the pattern cam.

Referring again to FIGS. 2, 3, 10, 15 and 16, support member 67 has an aperture 113 formed therethrough which rotatably receives the lower hub 114a of a member 114 which has a larger diameter central portion 114b. A headed screw 115 secures part 114 in engagement with support 67. The central portion 114b of member 114 has a pair of notches 116 formed therein for a purpose to be described.

A lever 117 has an enlarged aperture 117a of a size sufficient to embrace the large diameter portion 114b of member 114, and the thickness of lever 117 is substantially one-half or less the axial extent of the portion 114b. Rollers 118 having axial lengths of the order of the thickness of plate 117 are positioned in the notches 116 and biased, by springs 119, toward the shallower portions of the notches to effect a wedging action between the member 114 and the lever 117.

A relatively thin retainer plate 227, best seen in FIG. 16, is positioned on the upper surface of lever 117 and has a conforming fit over enlarged portion 114b of member 114. Retainer 227 maintains rollers 118 and springs 119 in position. A second lever 121 has a circular aperture 120 which fits over portion 114b of member 114, and this lever likewise has a thickness a little less than one-half the axial extent of portion 114b. Lever 121 is secured to support 67 by screws 122 and 123. Rollers 124, having an axial length of the order of the thickness of plate 121 are disposed between the periphery of aperture 120 and the notches 116, and are biased by springs 125 to effect a wedging action between lever 121 and member 114. A retainer plate 129 is positioned over lever 121 to maintain rollers 124 and springs 125 in position, retainer plate 129 having an aperture 126 fitting the small diameter upper hub 114c of member 114. Retainer 129 is secured to the upper surface of portion 114b of member 114 by means of screws 127.

A pin 130 is threaded into the upper surface of retainer 129 and extends through an aperture 132 in an annular plate 133 having a central aperture 131 fitting the hub portion 126 of retainer 129. The upper small diameter hub 114c of member 114 extends through hub 126 and through the aperture 131. An annular drum-shaped member 135 is seated on the upper portion of hub 114c and rests on the upper end of hub 126. The periphery of member 135 is formed with three recesses 134 in which are engaged the spring legs 136a of a spring 136 seating on top of the member 135 and held in position by a screw 137 threaded into the upper end of hub 114c. Legs 136a are bowed outwardly to extend beyond the periphery of member 135.

Pattern cam 138 is seated on the plate 133, having a central aperture 139 which receives the member 135. Pattern cam 138 also has an offset aperture 140 through which the pin 130 extends. The pattern cam is maintained in position by the frictional bias of the legs 136a of the spring 136. Cam 138 has three stepped surfaces, the upper controlling the oscillation of the needle bar, the middle determining the needle position, and the lower controlling the cloth feeding.

Stepwise rotation of pattern cam 138 is effected by reciprocation of lever 117. As viewed in FIG. 10, when lever 117 is rotated clockwise, the rollers 118 (FIGS. 15 and 16) move to narrower portions of the notches and effect a wedging action which causes member 114 to rotate with lever 117. The upper rollers 124 are inactive at this time so that pattern cam 138 is rotated by member 114. However, when lever 117 makes a reverse movement, or is rotated counterclockwise, the upper rollers 124 effect a wedging action between member 114 and lever 121 which is fixed against rotation. The lower rollers 118 are now inactive. Thus, member 114 is intermittently angularly advanced, always in the same direction, by oscillation of lever 117. The speed of movement of pattern cam 138 varies in proportion to the angle of oscillation of lever 117. If the needle descends while lever 117 is moving counterclockwise, pattern cam 138 is at a standstill so that the amplitude of transverse oscillation of the needle is not changed.

Referring to FIGS. 3, 10 and 13, a lever 141, having a forked outer end, is pivotally connected to lever 117 by a pivot 142. A shaft 144 extends through a bore 145 in support portion 67 and has a spiral gear 143 on one end and meshing with the spiral gear on main shaft 10. The upper end of shaft 144 has a circular plate thereon from which there extends an eccentric pin 146 which is engaged in the forked outer end of lever arm 141. A slide 147 is pivoted to arm 141 at a pivot 148, and is engaged in a rectangular guide groove 149a in the upper surface of a member 149 which has a hub 159b rotatably extending through a bore 150 in support member 67. An arm 152 is fixed to the hub 159b and has a notch 153 in its outer end receiving a pin 160 on an arm 161 which is pivoted at 158 to support 67. A circular plate 155 having a cam portion 154 is pivoted to support 67 as indicated at 156. A cam follower arm 159 is engaged with cam 154 and is pivoted at 158 to support 67. A spring 162 is secured at one end to arm 152 and at its other end to a suitable point on support member 67. Thereby, when plate 155 is angularly adjusted, cam follower arm 159 is angularly adjusted by cam 154 so that rotary member 149 is angularly adjusted through the medium of arm 152. This adjusts the angle of guide groove 149a.

With the construction described, eccentric 146 is revolved by rotation of main shaft 10, and thus oscillates lever 141 to, in turn, oscillate lever 117 and stepwise rotate pattern cam 138. This is effected by virtue of the reciprocation of slide 147 in groove 149a. The amplitude of reciprocation of lever 141, and thus the amplitude of oscillation of lever 117, is adjusted by angular adjustment of plate 155, through the medium of cam 154 engaging the cam follower 159 to angularly adjust arm 161 and thus the lever 152. As seen in FIG. 1, plate 151 extends through a window 163 in the front wall of arm 3 for easy access for manual adjustment.

Referring to FIG. 2, a forked rod 164 for the cloth feeding mechanism is engaged with the triangular cam 16 and extends downwardly through post 2. The lower end of rod 64 is connected to mechanism 166 interlocking with the cloth feed claw 165. As is well known to those skilled in the art, vertical reciprocation of rod 164 operates the cloth feed claw 165, with the amount of feed being determined by the amplitude of reciprocation of rod 64. The motion of the cloth feed is effected by the operation of rod 164 which is related to the reciprocation of the needle bar so that cloth feeding is effected while the needle 32 is retracted upwardly.

Figure 17:
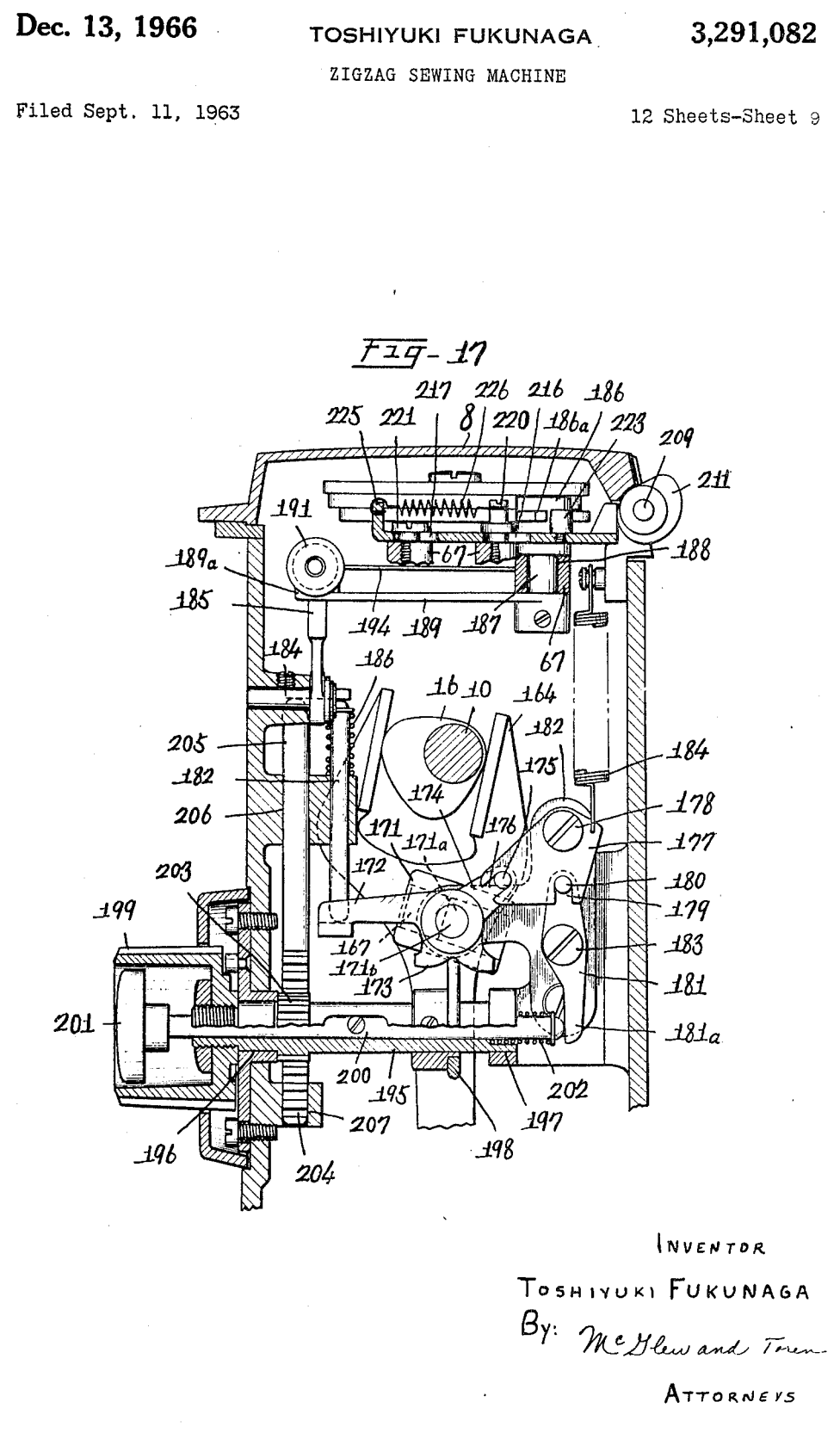

As best seen in FIGS. 2 and 17, a slide 167 is pivoted at 168 to rod or arm 164 and is engaged in the guide groove 171a in a member 171 which is mounted on a support portion 169 in post 2. An arm 172 is fixed to the shaft 171b of member 171 and extends transversely with respect thereto. The lower portion of arm 172 is formed with a heart-shaped cam 173, and arm 172 has an arm 174 extending therefrom in substantially the opposite direction with respect to shaft 171b. A pin 175 on the outer end of arm 174 engages in a notch 176 in a plate 177 oscillatably mounted at 178 on support portion 169. A rocking lever 181 is pivotally mounted at 183 and has a pin 180 at one end which is engaged in a notch 179 in plate 177. Pivots 178 and 183 are mounted in a supporting portion 182 of the structure. A spring 184 has one end connected to plate 177 and its opposite end secured to post 2 at a suitable point as illustrated in FIG. 17.

Through plate 177, notch 176 and pin 175, spring 184 biases arm 172 in an upward direction. This bias tends to turn the member 171 having the guide groove 171a. When groove 171a extends obliquely, as indicated in FIG. 17, the oscillation of forked arm 164 by cam 16 effects a vertical reciprocation of rod 164. The amplitude of such reciprocation varies in accordance with the angle of inclination of guide groove 171a. Under the bias of spring 184, the guide groove 171a tends to assume a position wherein the cloth feed is a maximum.

When a force is applied to the rotary arm 172 in resistance to the spring 184, the inclination angle of said guide groove 171 diminishes and accordingly the amplitude of vertical motion of the forked rod 164 also diminishes. When the guide groove 171 is adjusted to be perpendicular to the longitudinal direction of forked rod 164, the distance of vertical motion of forked rod 164 becomes zero, and conversely, when the guide groove inclines in reverse direction, the direction of cloth feeding becomes reverse (negative), and the feeding amount varies in accordance with the angle of its inclination.

A rod 182 is slidably supported for vertical reciprocation in post 2, and its lower end is engaged with the free end of arm 172. The upper end of rod 182 engages one arm of a bell crank lever 185 pivoted at 184 in post 2. A spring 186 embraces 182 and biases it in an upward direction. In a manner described hereinafter, the other arm of lever 185 is operatively associated with cam 138. By oscillation of lever 185 with resultant vertical motion of rod 182, arm 172 is angularly adjusted to change the angle of inclination of the guide groove 171a. Thereby, the direction and amplitude of the cloth feeding movement is controlled by cam 138.

A cam follower 186 is engaged with pattern cam 138 and is secured to one end of a shaft 187 which is rotatably mounted in support portion 67 of the machine frame. An arm 189 is secured to the lower end of shaft 187 and, as best seen in FIG. 18, a threaded stud 190 extends through an aperture in the free end 189a of arm 189. On one side of arm 189, an adjusting nut 191 is threaded onto stud 190 and, on the other side of the arm, a washer 228 fits loosely over the stud. A concave spring plate is engaged with stud 190 and with washer 228 and biases stud 190 in a direction to press nut 191 against arm 189. Stud 190 has a bore 193 therethrough which receives a metal wire 194 whose other end is secured to support portion 67. The end of screw 190 outwardly of spring 192 engages the upwardly extending arm of lever 185. Stud 190 may be adjusted in one direction by means of nut 191 to adjust the angle of the guide groove 171a and thereby to regulate the cloth feed. Thereby, any error in the manufacture of pattern cam 138 or in the adjustment of the parts may be compensated by adjusting the stud 190.

Again referring to FIGS. 2 and 17, a tubular shaft 195 is supported in bearings 196 and 197 and extends through the front wall of post 2. An ovoid cam 198 is secured on shaft 195 and is engaged with cam 173. The relation between cams 198 and 173 is such that, when cam 198 is engaged with the concave cam surface of cam 173, the position of the guide means 171 is determined by both cams to be such that the cloth feed is at zero. When cam 198 is disengaged from the concave surface of cam 173, as by rotation of shaft 195, the guide means 171 is biased by spring 184 to effect a forward direction of cloth feed. Cam 198 is used solely for hand adjustment of the amount of cloth feed. For this purpose, an adjusting knob 199 is fixed to the projecting portion of shaft 195.

A rod 200 is slidably mounted in shaft 195 and its inner end is engaged with the free end 181a of lever 181. A push button 201 is fixed to its outer end. When button 201 is pushed, the inclination of guide member 171 is reversed against the bias of spring 184 through the medium of lever 181, plate 187 and arm 174. Thereby, the cloth feeder operates in the reverse or negative direction. A spring 202 embraces rod 200 and is engaged between this rod and hollow shaft 195.

A pinion 203 is secured to hollow shaft 195 and is engaged with a rack 204 on the lower end of a rod 205. Rod 205 is slidably supported, as indicated at 206 and 207, in the front wall of post 2. Its upper end engages that arm of lever 185 which is also engaged by the rod 182. Consequently, when lever 185 is rocked due to the motion of the pattern cam 138, rack 205 moves downwardly and rotates pinion 203 and shaft 195 so that ovoid cam 198 is rotated to the position providing the maximum amplitude of cloth feed.

The adjustment of the amount of manual cloth feeding is effected by engagement of cams 173 and 198. When the cloth feeding is changed from hand operation to automatic operation under the control of the pattern cam, the feed, in automatic operation, is greater than that during hand operation. Thereby, the machine would be damaged unless ovoid cam 198 is in a position such that the amplitude of cloth feeding is a maximum. Consequently, the mechanism just described is for the purposes of safety in automatic operation.

As illustrated in FIGS. 3 and 17, the lid or cover 8 is joined with 208 the backside of machine frame, and shaft 209 is fixed to the lid 8 at the joined portion 208. Both ends of shaft 209 protrude and cams 210 and 211 respectively, are fixed on said protruded portions.

As best seen in FIGS. 3, 9 and 17, followers 212 and and 213 are engaged with cams 210 and 211, respectively, and are slidably supported on support portion 67 by means of having elongated apertures 214, 215 and 216, 217, respectively, formed therein. Pins 222 and 223 are mounted on followers 212 and 213, respectively. A spring 224 extends between pin 222 and a support portion 218, to bias follower plate 212 to engage cam 210. Follower plate 213 has an upstanding end 225, and a spring 226 is connected between end 225 and support portion 218 to bias follower plate 213 to engage cam 211.

Fingers 111a and 98a are engaged with pin 22 of follower plate 212 and form part of follower 111 controlling the amplitude of oscillation during zigzag stitching and, respectively, of follower 98 controlling the needle position and which two followers, 111 and 98, are engaged with pattern cam 138. Follower 186, which is engaged with the pattern cam for controlling the feeding of the cloth, has an extension 186a which is engaged with pin 223 of follower plate 213.

When lid or cover 8 is opened, follower plates 222 and 223 move against the bias of springs 224 and 226, by virtue of operation thereof by cams 212 and 213, respectively. Followers 111 and 98 are disengaged from pattern cam 138 by pins 222 and 223, respectively, so that disengagement removal and replacement of the pattern cam may be readily effected. Care must be taken that, when followers 111, 98 and 186 are engaged with pattern cam 138, when cover 8 is closed, the spacing between pins 222 and 223 and extensions 111a, 98b and 186a of the followers must be sufficient so that they do not interfere with each other.

The operation of the machine will now be explained. When wheel 14 is rotated either by motor or by operation of foot pedals, main shaft 10 rotates, needle bar 6 reciprocates vertically, and shuttle 19 oscillates. Simultaneously, the pattern cam is intermittently rotated and controls the amplitude of oscillation during zigzag stitching, the needle position, and the cloth feed. Not only can an amplitude of oscillation of approximately 15 mm. be attained, which is substantially three times the amplitude attainable with conventional machines, but also it is possible to stitch various figures, embroideries and patterns as indicated in FIGS. 38 and 39, which heretofore have not been possible to make on a zigzag sewing machine.

Figure 20:
Figure 21:
Figure 22:

When knob 55 is turned to the proper position, the patterns produced by operation of the pattern cam 138 is altered with respect to the stitch width and the needle track. Both the needle position and the stitch breadth are changed simultaneously. FIGS. 20 to 22 illustrate patterns formed by adjustment of the needle path and the cloth feed, the difference in the stitches being in their breadth which is controlled by the amplitude of oscillation of the needle. Thus, the patterns can be enlarged or reduced as to stitch width by proper adjustment of knob 55. With reference to FIGS. 20 to 22, when the pattern is enlarged by the adjustment of knob 25, the position of the needle path is gradually offset from center and the reverse occurs when the pattern is reduced in width.

Figure 23:
Figure 24:
Figure 25:

FIGS. 23–25 illustrate the case where the cloth feed is maintained at a fixed value and the path of the needle and the amplitude of oscillation is changed. These patterns are enlarged and reduced by adjustment of knob 55 in the same manner as for the case of FIGS. 20–22. The difference of FIGS. 23–25 over FIGS. 20–22 is that, when the pattern is enlarged, the range of shifting of the needle path is increased and vice versa when the pattern is reduced.

Figure 26:
Figure 27:
Figure 28:
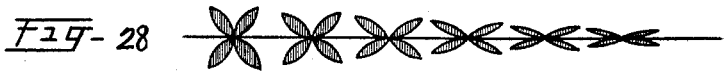

FIGS. 26–28 illustrate the case where the pattern cams change the amplitude of oscillation, the needle path and the cloth feed, and these patterns may be enlarged or reduced in the same manner as for the patterns shown in FIGS. 20 through 25. The cloth feed remains at a constant value.

When circular plate 163 is adjusted, the speed of operation of the pattern cam is changed, and it is possible to obtain patterns having different lengths of stitches, as indicated in FIGS. 29 to 31. Insofar as the amplitude of oscillation of the needle is concerned, the patterns of FIGS. 29 to 31 are the same as those shown in FIGS. 20–22.

The stitch pattern shown in FIGS. 32–34 are generally similar to those shown in FIGS. 23–25, but result when the speed of advance of the pattern cam is changed. Similarly, the patterns shown in FIGS. 35–37 are generally like the patterns shown in FIGS. 26–28, but result from changes in the rate of intermittent rotation of the pattern cam.

Embroidered figures, such as illustrated in FIG. 38 are effected by using pattern cams which vary three functions, namely the amplitude of transverse oscillation, the position of the needle path, and the cloth feed, and these patterns, as illustrated in FIG. 39, can be enlarged, reduced, or otherwise varied.

While a specific embodiment of the invention has been shown and described in detail to illustrate the application of the principles of the invention, it will be understood that the invention may be embodied otherwise without departing from such principles.

What I claim is:

1. A zigzag sewing machine comprising, in combination, a frame; a horizontal main drive shaft rotatably mounted in said frame; a needle bar guide mounted in said frame for oscillation transversely of the stitching path; a needle bar reciprocable substantially vertically in said needle bar guide; a universal pivot connection on the upper end of said needle bar; a balance weight fixed to an end of said main drive shaft; a crank mounted on said balance weight, for adjustment to a selected fixed position thereon, about an axis in parallel eccentric relation to that of said main drive shaft; said crank having a radial arm extending therefrom; a vertical guide rail mounted in said frame in displaced perpendicular relation to that of said main drive shaft; a crank rod extending upwardly of said machine and having a lower end portion pivotally connected to the outer end of said radial arm, and an upper end pivotally connected to said universal pivot connection on the upper end of said needle bar and slideably connected to said guide rail; whereby the upper end of said crank rod will, during each revolution of said main drive shaft, provide a relatively high speed of upward movement of said needle bar in the upper range of the reciprocation thereof and a relatively low speed in the lower range of downward movement thereof; and oscillating means, connected to said needle bar guide and said main drive shaft, to simultaneously oscillate said needle bar guide.

2. A zigzag sewing machine, as claimed in claim 1, including an interchangeable pattern cam; and cam follower means engaged with said pattern cam and operatively connected to said oscillating means and effective to vary the amplitude of oscillation under the control of said pattern cam.

3. A zigzag sewing machine, as claimed in claim 2, including a pattern cam shaft interchangeably mounting said pattern cam; and driving mechanism connected to said main drive shaft and operatively associated with said pattern cam shaft and effective to step said pattern cam shaft angularly in one direction in synchronism with reciprocation of said needle bar and during the time a needle mounted in said needle bar is retracted from the work.

4. A zigzag sewing machine, as claimed in claim 3, including means interposed in said driving mechanism and engaged with said pattern cam and operable to adjust the amplitude of angular stepping of said pattern cam shaft under the control of said pattern cam.

5. A zigzag sewing machine, as claimed in claim 3, including means blocking reverse rotation of said pattern cam shaft.

6. A zigzag sewing machine, as claimed in claim 4, including work feeding means having an operating member reciprocated by said main drive shaft; and a cam follower means engaged with said pattern cam and connected to said operating member and effective to vary the stroke of said operating member under the control of said pattern cam.

7. A zigzag sewing machine, as claimed in claim 6, in which said pattern cam is an annular disk mounted on said pattern cam shaft and having three axially stepped cam paths extending around its periphery; one of said cam paths controlling the amplitude of oscillation of said needle bar, another of said track controlling the amplitude of angular stepping of said pattern cam shaft, and the third track controlling the amplitude of reciprocation of said operating member of said work feeding means.

8. A zigzag sewing machine, as claimed in claim 6, including manual means selectively operable on said operating member to adjust the amplitude of reciprocation thereof to manually select the work feed; and means operable by said pattern cam effective automatically to disengage said manual operating means from said operating member upon initiation of automatic operation of the machine under the control of said pattern cam.

References Cited by the Examiner

UNITED STATES PATENTS

| 2,128,120 | 8/1938 | Christensen et al. | 112—221 X |
| 3,055,324 | 9/1962 | Klaar et al. | 112—158 |
| 3,064,603 | 11/1962 | Iida et al. | 112—158 |
| 3,090,334 | 5/1963 | Hayaski et al. | 112—158 |
| 3,131,658 | 5/1964 | Yanagibayashi et al. | 112—158 |

FOREIGN PATENTS 151,187    9/1962    Russia.

JORDAN FRANKLIN, *Primary Examiner.*

ROBERT V. SLOAN, R. J. SCANLAN, Jr.,
*Assistant Examiners.*